(12) United States Patent
Jeong et al.

(10) Patent No.: US 10,304,120 B2
(45) Date of Patent: May 28, 2019

(54) MERCHANDISE SALES SERVICE DEVICE BASED ON DYNAMIC SCENE CHANGE, MERCHANDISE SALES SYSTEM BASED ON DYNAMIC SCENE CHANGE, METHOD FOR SELLING MERCHANDISE BASED ON DYNAMIC SCENE CHANGE AND NON-TRANSITORY COMPUTER READABLE STORAGE MEDIUM HAVING COMPUTER PROGRAM RECORDED THEREON

(71) Applicant: Eleven Street Co., Ltd., Seoul (KR)

(72) Inventors: Seong Hoon Jeong, Seoul (KR); Sung Bak Baek, Seoul (KR)

(73) Assignee: ELEVEN STREET CO., LTD., Seoul (KR)

( * ) Notice: Subject to any disclaimer, the term of this patent is extended or adjusted under 35 U.S.C. 154(b) by 550 days.

(21) Appl. No.: 14/861,652

(22) Filed: Sep. 22, 2015

(65) Prior Publication Data
US 2016/0098780 A1    Apr. 7, 2016

(30) Foreign Application Priority Data
Oct. 7, 2014  (KR) .......................... 10-2014-0134775

(51) Int. Cl.
*G06Q 30/06* (2012.01)
*G06F 3/0488* (2013.01)
*G06T 19/20* (2011.01)
*G06F 3/01* (2006.01)
(Continued)

(52) U.S. Cl.
CPC ......... *G06Q 30/0633* (2013.01); *G06F 3/012* (2013.01); *G06F 3/017* (2013.01); *G06F 3/04815* (2013.01); *G06F 3/04845* (2013.01); *G06F 3/04883* (2013.01); *G06Q 30/0643* (2013.01); *G06T 19/20* (2013.01); *G06F 2203/04804* (2013.01); *G06T 2219/2016* (2013.01)

(58) Field of Classification Search
CPC .................................................. G06Q 30/0633
USPC ......................................................... 705/26.8
See application file for complete search history.

(56) References Cited

U.S. PATENT DOCUMENTS 7,222,091 B2 *  5/2007  Yoshida ................. A61B 3/032
                                                         351/246
7,353,188 B2 *  4/2008  Yim .................... G06Q 30/0239
                                                         705/26.62

(Continued)

*Primary Examiner* — Alexis M Casey
(74) *Attorney, Agent, or Firm* — Brinks Gilson & Lione (57) ABSTRACT

The present invention provides a merchandise sales service device based on dynamic scene change, a merchandise sales system based on dynamic scene change, a method for selling merchandise based on dynamic scene change, and a non-transitory computer readable storage medium having computer program recorded thereon. That is, it is possible to transmit information about a commodity and image information of the commodity to user equipment by efficiently configuring images and dynamically changing the images in a commodity purchase procedure. Accordingly, a user can acquire detailed information about a commodity and carefully purchase the commodity, similar to actually purchasing the commodity at an offline store. Further, it is possible to reduce the rate of returning of purchased commodities for the seller of the commodities.

6 Claims, 8 Drawing Sheets

(51) Int. Cl.
*G06F 3/0481* (2013.01)
*G06F 3/0484* (2013.01)

(56) References Cited

U.S. PATENT DOCUMENTS

| | | | | |
|---|---|---|---|---|
| 7,617,135 | B2* | 11/2009 | Harris | G06Q 30/0633 |
| | | | | 705/27.2 |
| 7,680,694 | B2* | 3/2010 | Glazer | G06Q 30/0253 |
| | | | | 705/26.43 |
| 8,738,471 | B2* | 5/2014 | Harris | G06Q 30/0633 |
| | | | | 705/26.1 |
| 9,704,192 | B2* | 7/2017 | Ainsworth | G06Q 30/0633 |
| 9,824,391 | B2* | 11/2017 | Glazer | G06Q 30/0253 |
| 2007/0192203 | A1* | 8/2007 | Di Stefano | G06Q 30/02 |
| | | | | 705/26.8 |
| 2008/0129957 | A1* | 6/2008 | Mellon | G02B 27/017 |
| | | | | 351/159.19 |
| 2013/0113827 | A1* | 5/2013 | Forutanpour | G06T 3/4038 |
| | | | | 345/633 |
| 2014/0244435 | A1* | 8/2014 | Yahata | H04N 21/2543 |
| | | | | 705/26.8 |
| 2017/0024808 | A1* | 1/2017 | Plattsmier | G06Q 30/0633 |

* cited by examiner

MERCHANDISE SALES SERVICE DEVICE BASED ON DYNAMIC SCENE CHANGE, MERCHANDISE SALES SYSTEM BASED ON DYNAMIC SCENE CHANGE, METHOD FOR SELLING MERCHANDISE BASED ON DYNAMIC SCENE CHANGE AND NON-TRANSITORY COMPUTER READABLE STORAGE MEDIUM HAVING COMPUTER PROGRAM RECORDED THEREON

CROSS-REFERENCE TO RELATED APPLICATION

This application claims the benefit of Korean Application No. 10-2014-0134775 filed on Oct. 7, 2014 with the Korean Intellectual Property Office, the disclosure of which is incorporated herein by reference.

BACKGROUND OF THE INVENTION

1. Field of the Invention

The present invention relates to a merchandise sales service device based on dynamic scene change, a merchandise sales system based on dynamic scene change, a method for selling merchandise based on dynamic scene change, and a non-transitory computer readable storage medium having computer program recorded thereon. In particular, the present invention relates to a merchandise sales service device based on dynamic scene change for simply acquiring information about merchandise through user equipment, user equipment based on dynamic scene change, a method for selling merchandise based on dynamic scene change, and a non-transitory computer readable storage medium having computer program recorded thereon.

2. Description of the Related Art

It turned out that, in Korea, the internet was rapidly spread with expansion of information-oriented base and development of electronic commerce businesses from the mid-1990s and nine million three hundred four thousand internet users estimated in December 1999 increased to thirty four million four hundred thirty thousands in June 2007, that is, 75.5% of the entire population used the internet. Further, it turned out that 54.6% of the internet users were customers using internet shopping malls.

According to data from the National Statistical Office, the number of internet shopping mall enterprises increased about 36% point from 3,268 in 2003 to 4,445 at three quarter of 2007 and the amount of business increased from seven trillion fifty four billion eight hundred million Won to eleven trillion forty hundred twenty eight billion six hundred million Won. In the amount of business, the amount of business of clothes/fashion and relevant commodities increased from seventy hundred thirty billion Won to one trillion eighty hundred ninety seven billion one hundred million Won (about 16% point), which is given the largest weight.

In 2008, the number of enterprises operating internet shopping malls based on electronic commerce continuously increased with an increase in number of internet users close to 80% of the entire population in Korea.

With expansion of the internet market, shopping malls provide convenience such as one-stop shopping including shopping, purchasing, and paying to customers, thereby making modern people who have not much time to shop continuously use the shopping malls. Competition of internet shopping malls is getting severe, so they need to have various marketing strategies in order to secure superiority in the competition.

PRIOR ART DOCUMENT

Patent Document

Korean Patent Publication No. 10-2009-0121580 [Title: Method for displaying size recognizable product image in internet shopping mall]

SUMMARY OF THE INVENTION

An object of the present invention is to provide a merchandise sales service device based on dynamic scene change for more simply providing a commodity purchase procedure to users in a commodity purchase procedure made through mobile devices, a merchandise sales system based on dynamic scene change, a method of selling merchandise based on dynamic scene change, and a non-transitory computer readable storage medium having a computer program recorded thereon.

Another object of the present invention is to provide a merchandise sales service device based on dynamic scene change for more conveniently providing users with detailed commodity explanation information and commodity image information, a merchandise sales system based on dynamic scene change, a method of selling merchandise based on dynamic scene change, and a non-transitory computer readable storage medium having a computer program recorded thereon.

Another object of the present invention is to provide a merchandise sales service device based on dynamic scene change for conveniently providing users with 3D images of commodities, a merchandise sales system based on dynamic scene change, a method of selling merchandise based on dynamic scene change, and a non-transitory computer readable storage medium having a computer program recorded thereon.

A merchandise sales service device based on dynamic scene change according to an embodiment of the present invention may include: a commodity explanation providing unit that provides commodity explanation information and original commodity image information of a commodity selected by user equipment through a first image on the user equipment; a commodity image processing unit that creates post-processed commodity image information obtained by resizing and/or masking an image of the selected commodity; and a commodity option providing unit at that provides option information of the selected commodity on the basis of the post-processed commodity image information through a second image changed from the first image, when a purchase button implemented in the first image by the user equipment is selected.

As an example of the present invention, the merchandise sales service device based on dynamic scene change may further comprising a purchase proceeding unit that, when a shopping basket button implemented in the first image by the user equipment is selected, provides an image of a commodity selected by the shopping basket button on a third image changed from the first image on the user equipment on the basis of the post-processed commodity image information.

As an example of the present invention, a size to be resized and/or an area to be masked may be selected and created differently in the post-processed commodity image information in accordance with the option information or the number of commodities selected by the shopping basket button.

As an example of the present invention, when the original commodity image is touched by a user, the commodity image processing unit may provide a 3D image of the selected commodity.

As an example of the present invention, the 3D image may be provided in consideration of a turn angle of the user's head, and the commodity image processing unit may determine the turn angle of the user on the basis of an image of the user transmitted from the user equipment and provides the 3D image corresponding to the determined turn angle of the head.

As an example of the present invention, the 3D image may be provided in consideration of a hand action of the user, and the commodity image processing unit may create a virtual hand corresponding to the hand action on the basis of an image about the hand action transmitted from the user equipment and provide the 3D image corresponding to movement of the virtual hand.

As an example of the present invention, the 3D image may be provided in consideration of inclination of the user equipment, and the commodity image processing unit may provide the 3D image corresponding to the inclination of the user equipment transmitted from the user equipment.

A method of selling merchandise based on dynamic scene change according to an embodiment of the present invention may include: providing commodity explanation information and original commodity image information of a commodity selected by user equipment through a first image on the user equipment; creating post-processed commodity image information obtained by resizing and/or masking an image of the selected commodity; and providing option information of the selected commodity on the basis of the post-processed commodity image information through a second image changed from the first image, when a purchase button implemented in the first image by the user equipment is selected.

As an example of the present invention, the method of selling merchandise based on dynamic scene change may further include providing a 3D image of a commodity selected, when an original image of the commodity is touched for a predetermined time or less by the user.

The 3D image may be provided in consideration of a hand action of the user, the merchandise sales service device may create a virtual hand corresponding to the hand action on the basis of an image about the hand action transmitted from the user equipment and provide the 3D image corresponding to movement of the virtual hand, the movement of the virtual hand may be determined on the basis of features of fingers of the user which make the hand action, and the features of the fingers may be determined on the basis of the positions of the joints of the fingers.

As an example of the present invention, the method of selling merchandise based on dynamic scene change may further include processing the information of original commodity image into an image with predetermined transparency, putting the commodity explanation information on the original commodity image information processed into the image with predetermined transparency, and transmitting the information, when the original commodity image is touched for a predetermined time or more by the user.

A computer program that can perform the method according to the embodiment may be kept in a non-transitory computer readable storage medium having a computer program recorded thereon according to an embodiment of the present invention.

A merchandise sales system based on dynamic scene change, according to another embodiment of the present invention may include: a merchandise sales service device for providing commodity explanation information and original commodity image information of a commodity selected by user equipment through a first image on the user equipment, for creating post-processed commodity image information obtained by resizing and/or masking an image of the selected commodity, and for providing option information of the selected commodity on the basis of the post-processed commodity image information through a second image changed from the first image, when a purchase button implemented in the first image by the user equipment is selected; and user equipment that outputs the commodity explanation information and the original commodity image information provided by the merchandise sales service device, requests the merchandise sales service device to send the option information when the purchase button is selected, and receives the option information provided on the basis of the post-processed commodity image information.

According to the present invention, it is possible to provide more simply provide a commodity purchase procedure to a user in a commodity purchase procedure performed in real time through a mobile device, more simply provide detailed commodity explanation information and commodity image information, and conveniently provide a 3D image of a commodity to a user. Accordingly, a user can acquire detailed information about a commodity and carefully purchase the commodity, similar to actually purchasing the commodity at an offline store.

Further, it is possible to reduce the rate of returning of purchased commodities for the seller of the commodities.

DETAILED DESCRIPTION OF THE PREFERRED EMBODIMENTS

It should be noted that technical terminologies used herein are used only in order to describe specific embodiments rather than limiting the present invention. Further, the technical terminologies used here should be construed as being generally understood by those skilled in the art unless defined as specific meanings, not construed as being excessively general meanings or excessively narrow meanings. Further, if the technical terminologies used herein are wrong technical terminologies that cannot exactly express the spirit of the present invention, they should be replaced by technical terminologies that can be correctly understood by those skilled in the art. Further, common terms used herein should be construed in accordance with dictionary definitions or contexts, not being as excessively narrow meanings.

The singular forms used herein are intended to include the plural forms as well, unless the context clearly indicates otherwise. Terms "composed of" or "include" used herein should not construed as necessarily including all of various components or various steps, but construed that they may not include some of the components or steps or may further include additional components or steps.

Further, terms including ordinal numbers such as 'first' and 'second' may be used to describe various components, but the components are not to be construed as being limited to the terms. The terms are used to distinguish one component from another component. For example, the 'first' component may be named the 'second' component, and vice versa, without departing from the scope of the present invention.

Hereinafter, embodiments of the present invention will be described in detail with reference to the accompanying drawings, like reference numerals are given to like or similar components regardless of the figure numbers, and repeated description is not provided.

Further, in describing the present invention, detailed descriptions of well-known technologies will be omitted so as not to obscure the description of the present invention with unnecessary detail. Further, it should be noted that the accompanying drawings are provided only for easier understanding of the spirit of the present invention and should not be construed as limiting the spirit of the present invention.

Mobile commerce applications driven in mobile-based user equipment such as a smartphone and a tablet have a limit in providing commodity information due to a limit in size of the display of the user equipment. Accordingly, users have to repeat scrolling images or move on to other images not an image providing commodity information in order to acquire information for purchasing a commodity or purchase a commodity through the existing mobile commerce applications.

Currently, mobile commerce applications provided by most mobile-based user equipment provide various buttons for various procedures connected with purchasing a commodity selected from a specific image. A user can select specific options connected with purchasing a commodity through the specific image. Accordingly, when a user purchase a commodity through the existing mobile-based commerce application, images may be more complicated, scroll areas may increase, and concentration of a user may decrease.

An embodiment of the present invention to be described hereafter provides a method of effectively communicate commodity information to a user by minimizing image change for purchasing commodities so that a user can concentrate on important specifications about commodities while the user purchases commodities through mobile-based user equipment (hereafter, referred to as user equipment).

Figure 1:
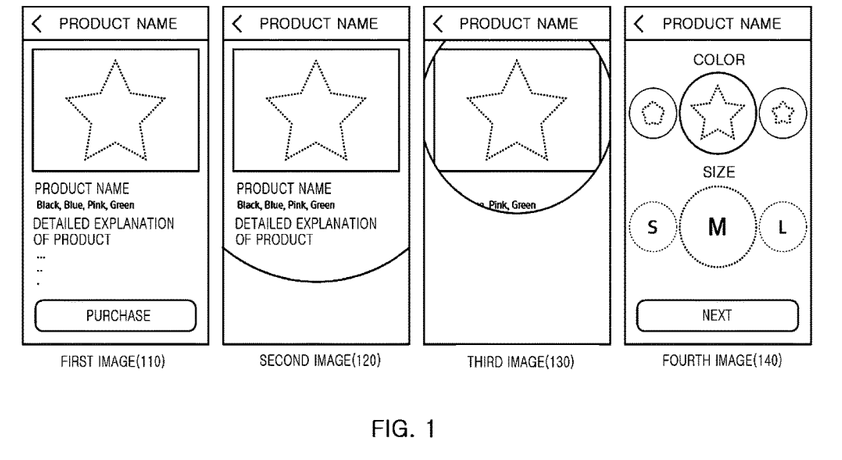
FIG. 1 is a conceptual diagram illustrating a commodity purchase procedure through a mobile commerce application according to an embodiment of the present invention.

FIG. 1 is a conceptual diagram illustrating a commodity purchase procedure through a mobile commerce application according to an embodiment of the present invention.

FIG. 1 illustrates a method of selecting commodity options in a commodity purchase procedure through a mobile commerce application. The commodity options may be additional selective information for purchasing a commodity such as a color, a size, and the number of pieces.

Referring to FIG. 1, a commodity (or product) image information, a commodity name, information about detailed explanation of a commodity, and commodity purchase button can be provided to a user through a first image 110. The commodity purchase button may be a button for deciding to purchase a commodity. A menu for selecting product options such as a size and a color may not be provided in the first image.

Only commodity information such as a commodity name and detailed explanation of a commodity, except for commodity options, may be displayed in the first image 110. A user can be provided with commodity information from the first image 110 without scrolling.

When a user selects the commodity purchase button, it may change to a second image 120 to a fourth image 140. In detail, when a user selects the commodity purchase button, a representative commodity image (for original commodity image) may be dynamically resized and/or masked and change to a post-processed commodity image. The post-processed commodity image created on the basis of image processing such a resizing and/or masking may be used in an image for selecting commodity options. The size to be resized and/or the area to be masked can be set differently in accordance with option information.

Information about options of a commodity to be selected by a user may be provided to the user from the fourth image 140. It is assumed in the fourth image 140 that commodity options are the size and the color of a commodity. A user can select the color and the size of a commodity through the fourth image 140.

That is, according to an embodiment of the present invention, a plurality of commodity options may be displayed in the first image 110 providing commodity information and the specific fourth image 140. A user can select the displayed commodity option and a procedure for purchasing a commodity may be performed on the basis of the selected commodity option. The commodity options may be changed in a left-right swiping type. All procedures for selecting a plurality of commodity options (for example, a color and a size) are provided from the fourth image 140, but separates images may be provided for each commodity option. For example, an image for selecting a color of commodity options and an image for selecting a size of commodity options may be separately provided on user equipment.

When a user selects a 'back' button at the top in an image or select a 'back' button on the hardware of user equipment, it may return to the first image 110 providing a representative commodity image not resized and masked.

Figure 2:
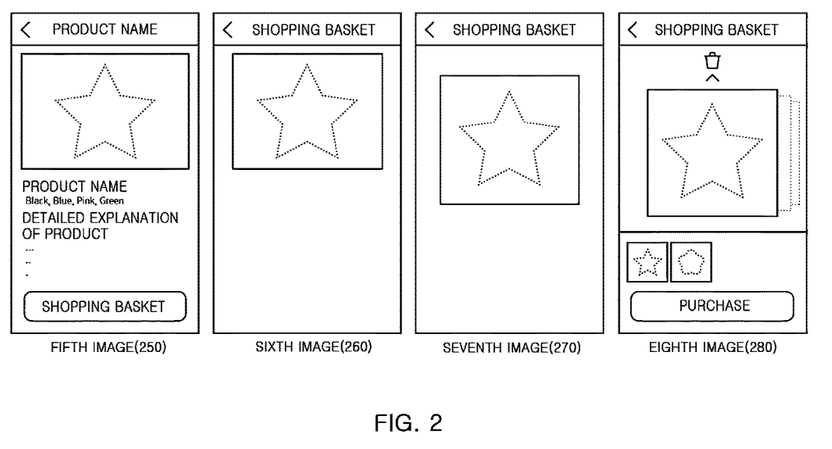
FIG. 2 is a conceptual diagram illustrating a commodity purchase procedure through a mobile commerce application according to an embodiment of the present invention.

FIG. 2 is a conceptual diagram illustrating a commodity purchase procedure through a mobile commerce application according to an embodiment of the present invention.

FIG. 2 illustrates a procedure of putting a commodity into a shopping basket in a commodity purchase procedure through a mobile commerce application.

Referring to FIG. 2, image information of a commodity, a commodity name, information about detailed explanation of a commodity, and a shopping basket button may be provided to a user from a fifth image 250. The shopping basket button may be a button for collecting at least one commodity selected by a user before purchasing it.

When a user selects the shopping basket button, it may change to a sixth image 260 to an eighth image 280 for purchasing a commodity. In detail, a user select the shopping basket button, a representative commodity image may be dynamically resized and masked and a shopping basket image shows up.

Commodities in the shopping basket may overlap each other at the upper portion in the eighth image 280. Commodities selected already by a user and a commodity purchase button for purchasing the selected commodities at a time may be displayed at the lower portion in the eighth image 280. When a user selects the commodity purchase button, a procedure for purchasing the commodities put in the shopping basket by the user can be performed. The user may separately select at least one commodity to purchase of the commodities in the shopping basket displayed at the upper portion or the lower portion in the eighth image 280. For example, the user can select a commodity to actually purchase of the commodities in the shopping basket by swiping or long-touching it.

The user can concentrate on the commodity purchase procedure through user equipment by the procedures illustrated in FIGS. 1 and 2. That is, interaction factors for purchasing a product on user equipment are simplified, so more areas of the screen can be used for commodity explanation. Further, an image of a commodity is dynamically adjusted on the basis of a mobile commerce application, so a user can go one with a commodity purchase procedure without changing images.

According to an embodiment of the present invention, a user can be additionally provided with image information of a commodity. For example, when a user clicks a commodity image in the first image 100 illustrated in FIG. 1 or the fifth image 250 illustrated in FIG. 2, a merchandise sales service device can provide more detailed commodity image information to the user.

Figure 3:
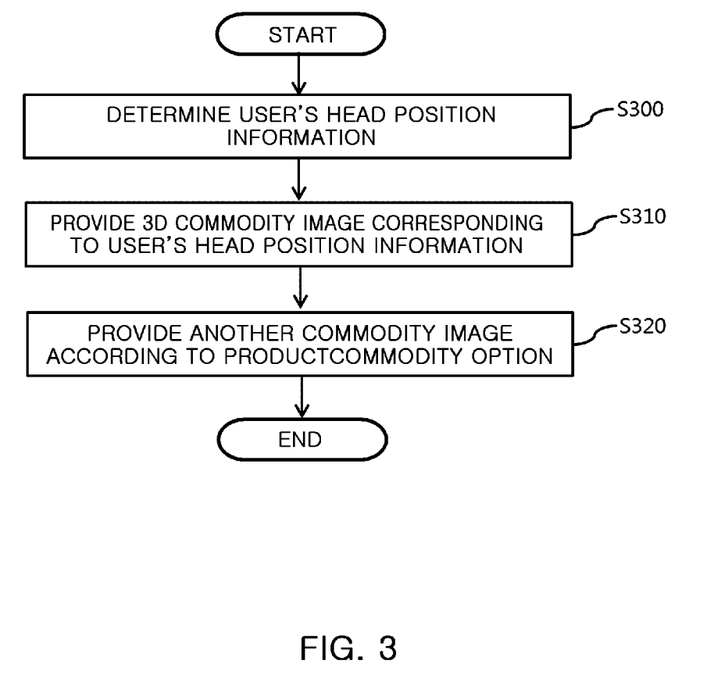
FIG. 3 is a conceptual diagram illustrating a method of providing a commodity information based on dynamic scene change according to an embodiment of the present invention.

FIG. 3 is a conceptual diagram illustrating a method of providing commodity information based on dynamic scene change according to an embodiment of the present invention.

FIG. 3 illustrates a method of providing information about a commodity image in a 3D type.

Referring to FIG. 3, when a user clicks an image of a commodity in the first image illustrated in FIG. 1, the user can be provided with a 3D image of the commodity (hereafter, referred to as a 3D commodity image) from the merchandise sales service device. For example, when a user clicks an image of a commodity, a 3D commodity image can be provided to the user throughout the display area of user equipment. That is, a 3D commodity image can be provided to a user in the largest size in consideration of the display size of user equipment.

The 3D commodity image can be provided in various ways. According to an embodiment of the present invention, the merchandise sales service device can display a 3D commodity image on user equipment in consideration of information about the position of the user's head (for example, the turn direction of a head). According to this way, a user can be provided with information about a commodity at various angles over the limit of a 2D commodity image, like actually seeing the commodity.

The information of the position of the user's head can be determined (S300).

The information about the position of the user's head can be determined in various ways. For example, it is possible to determine a turn angle of the user's head through a camera on user equipment. According to an embodiment of the present invention, the display angle of a 3D commodity image provided by the merchandise sales service device may depend on the turn angle of a head. The turn angle of a head may depend on a specific part on a face such as the nose, the eyes, and the mouth. A method of determining a turn angle of a head will be described in detail below through an embodiment of the present invention.

A 3D commodity image corresponding to the information about the position of the user's head is provided through user equipment (S310).

The merchandise sales service device can display a 3D commodity image corresponding to the turn angle of the user's head on user equipment. The user equipment can transmit the information about the position of the user's head to the merchandise sales service device and the merchandise sales service device can transmit a 3D commodity image corresponding to the information about the position of the user's head. Alternatively, a 3D commodity image may be provided to user equipment in advance and a mobile commerce application in the user equipment can provide a 3D commodity image corresponding to the information about the position of the user's head to the user equipment in consideration of the information about the position of the user's head.

Other commodity images are provided through the user equipment in accordance with commodity options in response to input signals by a user (S320).

The input signal by a user for providing other commodity images according to commodity options may be various signals. For example, when a user touches a 3D commodity image displayed on user equipment, another commodity image that is the same commodity but has different options (for example, a 3D commodity image with another color and a 3D commodity image with another size) may be displayed on the user equipment. The input signal by a user for providing other commodity images according to options may be another operation signal or a sound signal in addition to a touch signal.

Thereafter, a 3D commodity image corresponding to the information about the position of the user's head may be provided to user equipment through the steps S300 and S310.

Figure 4:
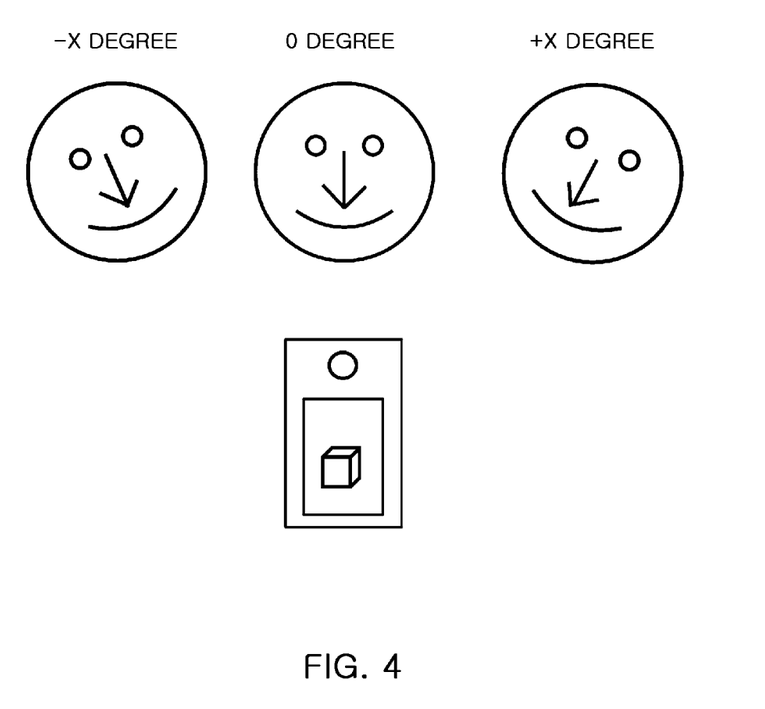
FIG. 4 is a conceptual diagram illustrating a method of determining a turn of the user's head according to an embodiment of the present invention.

FIG. 4 is a conceptual diagram illustrating a method of determining a turn of the user's head according to an embodiment of the present invention.

Referring to FIG. 4, it is possible to recognize the face of a user photographed by a camera on user equipment in order to determine a turn of the user's head.

Recognition of the user's face can extract the face area of the user in the image taken on the basis of a face template. A turn of the user's head may be determined on the basis of features on a specific part of the user's face such as the mouth, the nose, and the eyes.

When a user looks user equipment in front of it, the turn angle of the head may be determined as 0 degree. When the user turns the head clockwise (or looks at user equipment at the right side by turning the head), the angle may be determined +1 degree to +X degrees, and when the user turns the head counterclockwise (or looks at the user equipment at the left side by turning the head), the angle may be determined as −1 degree to −X degrees. That is, the turn angle of the user' head may be one of angles within +X to −X degrees. In an embodiment of the present invention, it is assumed that the change in turn angle of a head is determined in the unit of 1 degree for the convenience of description, but the change in turn angle of a head may be determined in a unit smaller or larger than 1 degree.

For example, when it is based on the nose, user equipment can determine a change in turn angel of the head according to a change in angle of the user's nose. When a user looks at user equipment in front of it, the nose may be in the vertical direction (0 degree) and the turn angle of the user's head may be determined as 0 degree. When the user looks at the user equipment at the right side by turning the head, the angle of the nose may be +1 to +Y degrees at maximum, which may correspond to the turn angle of the user's head of +1 degree to +X degrees. Similarly, when the user looks at the user equipment at the left side by turning the head, the angle of the nose may be −1 to −Y degrees at maximum, which may correspond to the turn angle of the user's head of −1 degree to −X degrees.

Not only the nose, but other specific parts of the face such as the eyes and the mouth may be used to determine the turn angle of the use's head.

The merchandise sales service device can provide a commodity image corresponding to the turn angle of the user's head to user equipment. The display angle of a 3D commodity image may depend on the turn angle of a head. As described above, 3D commodity images turning clockwise or counterclockwise from 0 degree to 360 degrees in accordance with turn of a head within ⊚ degrees to +X degrees may be displayed on user equipment. For example, when X is 30 degrees, as the user's head turns at 1 degree, the display angle of a 3D commodity image corresponding to 6 degrees may change.

Figure 5:
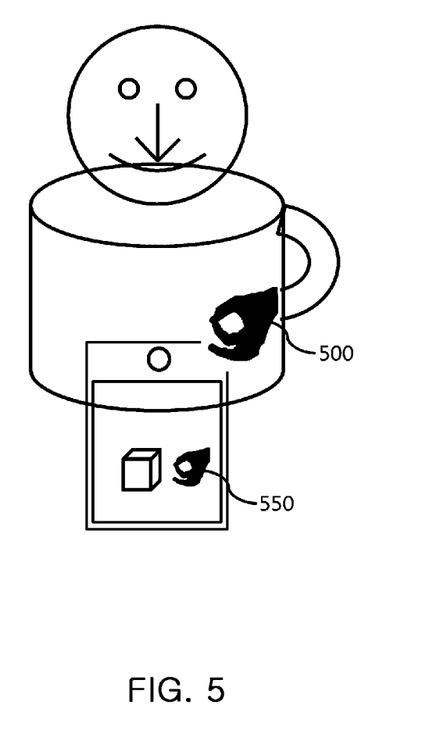
FIG. 5 is a conceptual diagram illustrating a method of providing a 3D commodity image in consideration of an action of a user's hand according to an embodiment of the present invention.

FIG. 5 is a conceptual diagram illustrating a method of providing a 3D commodity image in consideration of an action of a user's hand according to an embodiment of the present invention.

FIG. 5 illustrates a method of providing a 3D commodity image in consideration of an action of a user's hand like the user actually select an object.

Referring to FIG. 5, a 3D commodity image may be provided to a user in consideration of an action of a user's hand.

Similarly, when a user clicks an image of a commodity in the first image, the user can be provided with a 3D commodity image from the merchandise sales service device. For example, when a user clicks a plane image of a commodity, a 3D commodity image may be provided through the entire screen of user equipment, overlapping the display of the user equipment.

When a user put a hand (500) on a camera on user equipment, a small hand shape considering the action of the user's hand may be displayed on the display of the user equipment. When a user actually makes a specific hand action using the hand 500, a virtual hand 550 on the screen of user equipment may change to the specific hand action in consideration of the user's hand action.

The user can turn a 3D commodity image in the image by touching it on the basis of the virtual hand 550. For example, when a user actually turns a hand to the left or right, the virtual hand 550 in the user equipment can turn a commodity to the left or right and a 3D commodity image corresponding to the degrees of turns can be provided from the merchandise sales service device.

Similarly, when a user actually makes a turn for turning a commodity upward or downward with a hand to see the bottom or the top of the commodity, the virtual hand in the user equipment can turn the commodity upward or downward and 3D commodity images corresponding to the degrees of turns can be provided from the merchandise sales service device.

According to this method, a user can be provided with commodity information from the merchandise sales service device with the same effect as picking up, turning, and looking at the actual commodity.

In order to implement the interface based on the virtual hand 550, the merchandise sales service device can change the shape of the virtual hand 550 by analyzing features of the user's hand 500 transmitted through the user equipment. In detail, a movement of the virtual hand 550 may be determined on the basis of features of fingers of a user that make a hand action and the features of the fingers may be determined on the basis of the positions of the joints of the fingers.

Further, the merchandise sales service device can provide a 3D commodity image corresponding to a movement of the virtual hand 550 by determining whether the fingers of the virtual hand 550 touch a 3D commodity image and the relationships between movements of the 3D commodity image by the fingers of the virtual hand 550 in order to determine the 3D commodity image provided on the basis of the position of the virtual hand 550.

Figure 6:
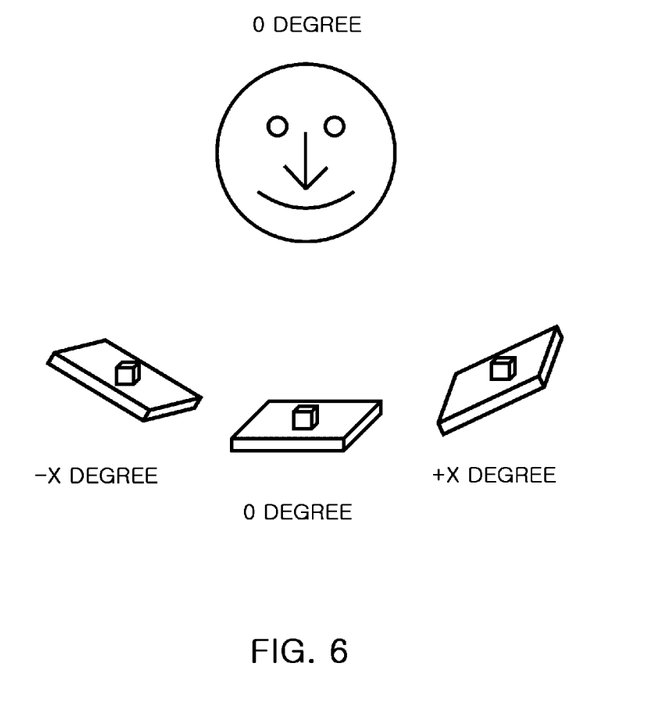
FIG. 6 is a conceptual diagram illustrating providing a 3D commodity image in consideration of inclination of user equipment according to an embodiment of the present invention.

FIG. 6 is a conceptual diagram illustrating providing a 3D commodity image in consideration of inclination of user equipment according to an embodiment of the present invention.

Referring to FIG. 6, a 3D commodity image can be provided to a user in consideration of inclination of user equipment.

Similarly, when a user clicks an image of a commodity in the first image, the user can be provided with a 3D commodity image from the merchandise sales service device. For example, when a user clicks a plane image of a commodity, a 3D commodity image may be provided through the entire screen of user equipment, overlapping the display of the user equipment.

When a user inclines user equipment at a predetermined angle, a 3D commodity image corresponding to the inclination angle of the user equipment can be displayed on the user equipment.

The user can incline the user equipment left or right, or up or down. An inclination sensor of the user equipment can sense the inclination angle and the inclination angle measured by the inclination sensor may be transmitted to the merchandise sales service device. The merchandise sales service device can provide a 3D commodity image corresponding to the inclination angle of the user equipment to the user through the user equipment.

For example, when the angle parallel with the ground is 0 degree, inclination angles sensed within X degree to the right and −X degrees to the left can be matched with 3D commodity images turned left or right within 360 degrees. Further, inclination angles sensed within Y degrees upward and −Y degrees downward can be matched with 3D commodity images turned up or down within 360 degrees.

Further, when the user shakes the user equipment, the merchandise sales service device can provide a 3D commodity image that is the same commodity but has other options to the user through the user equipment.

Figure 7:
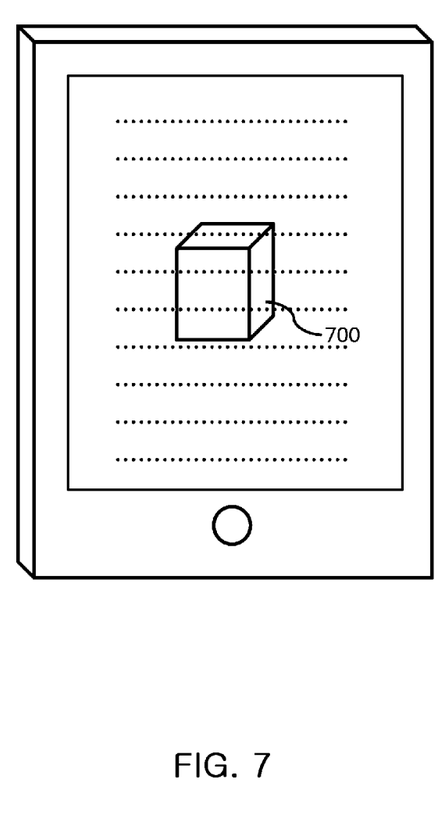
FIG. 7 is a conceptual diagram illustrating a method of simultaneously providing a commodity image and a commodity specification by user equipment according to an embodiment of the present invention.

FIG. 7 is a conceptual diagram illustrating a method of simultaneously providing a commodity image and commodity explanation by user equipment according to an embodiment of the present invention.

Referring to FIG. 7, a user can be provided with images of a commodity on the basis of them illustrated in FIGS. 4 and 6. When a user touches long an image 700 of a commodity additionally provided, the merchandise sales service device can make the image 700 of the commodity translucent and put explanation of the commodity (text information) on the translucent image.

According to this method, a user can be provided with and image and explanation information of a commodity without specifically scrolling.

In FIGS. 3 to 7, a method of providing a 3D commodity image and commodity explanation information in a changed format by means of the merchandise sales service device, but the 3D commodity image and commodity explanation information may be provided in a changed format through a mobile commerce application in user equipment.

Figure 8:
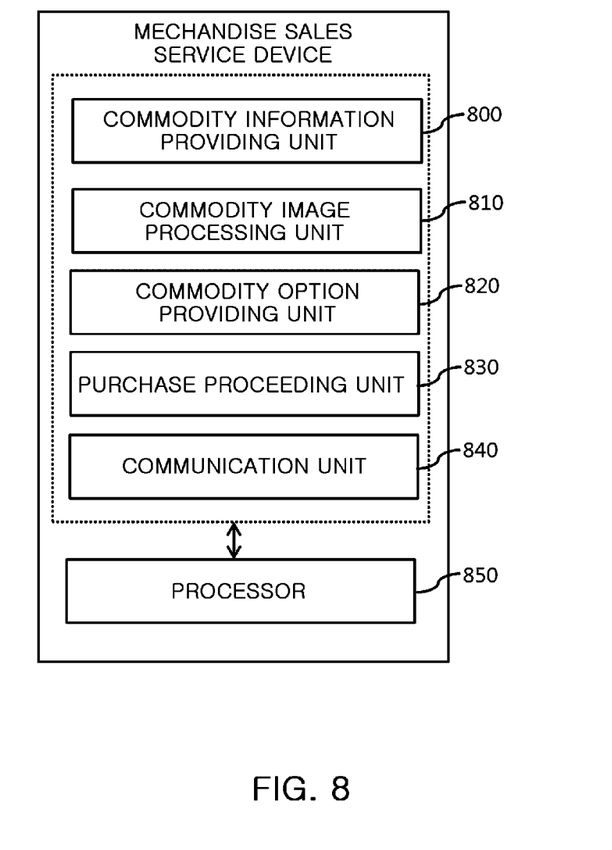
FIG. 8 is a block diagram illustrating a merchandise sales service device according to an embodiment of the present invention.

FIG. 8 is a block diagram illustrating a merchandise sales service device according to an embodiment of the present invention.

Referring to FIG. 8, the merchandise sales service device may include a commodity information providing unit 800, a commodity image processing unit 810, a commodity option providing unit 820, a purchase proceeding unit 830, a communication unit 840, and a processor 850.

The components of the merchandise sales service device may be implemented to perform the operation of the merchandise sales service device according to an embodiment of the present invention described with reference to FIGS. 1 to 7.

The commodity information providing unit 800 may be implemented to provide commodity explanation information and basic commodity image information for a commodity. For example, the commodity explanation providing unit 800 may be implemented to provide text information and image information of a commodity in a commodity purchase procedure.

The commodity image processing unit 810 may be implemented to provide post-processed commodity image information to a user by post-processing an original commodity image. The commodity image processing unit may be implemented to provide a post-processed commodity image provided in a commodity purchase procedure by performing image processing such as resizing and/or masking on an original commodity image. Further, the commodity image processing unit may be implemented to provide a 2D commodity image to user equipment for the user or a 3D commodity image to user equipment in the various ways described above.

For example, the commodity image processing unit 810 may create a post-processed commodity image by setting the size to be resized and/or the area to be masked differently in accordance with the number of commodities selected on the basis of option information or through a shopping basket button.

The commodity option providing unit 820 may be implemented to receive a commodity image processed (resized or masked) by the commodity image processing unit 810 and provide commodity options (for example, a color and a size) for purchasing a product to a user. The commodity option providing unit 820 may be implemented to provide option information of a commodity selected through the second image changed from the first image on the basis of post-processed commodity image information created by the commodity image processing unit 810, when a purchase button implemented in the first image of user equipment by the user equipment is selected.

The purchase proceeding unit 830 may be implemented to proceed a procedure for purchasing a commodity (for example, a procedure of providing options, a shopping basket function, and a payment procedure). In detail, the purchase proceeding unit 830 may be implemented to provide an image of a commodity selected through the shopping basket button in the third image changed from the first image of the user equipment on the basis of post-processed commodity image information created by the commodity image processing unit 810, when the shopping basket button implemented in the first image of user equipment by the user equipment is selected.

The communication unit may be implemented to transmit information needed for a purchase procedure and commodity image information by communicating with user equipment.

The processor 850 may be implemented to control the operation of the commodity information providing unit 800, the commodity image processing unit 810, the commodity option providing unit 820, the purchase proceeding unit 830, and the communication unit.

The merchandise sales service device based on dynamic scene change, merchandise sales system based on dynamic scene change, method for selling merchandise based on dynamic scene change can be recorded in a computer program, and codes and code segments of the computer program can be easily inferred by computer programmers in the field. Further, the computer program is stored in non-transitory computer readable storage media, and read and executed by a computer, a merchandise sales service device, or a user equipment according to an embodiment of the present invention, so synchronization method can be implemented.

The non-transitory computer readable storage media include a magnetic recording medium, an optical recording medium, and a carrier wave medium. A computer program for achieving the merchandise sales service device based on dynamic scene change, merchandise sales system based on dynamic scene change, method for selling merchandise based on dynamic scene change may be stored and installed in a built-in memory in the user equipment. Alternatively, an external memory such as a smart card in which a computer program for achieving the merchandise sales service device based on dynamic scene change, merchandise sales system based on dynamic scene change, method for selling merchandise based on dynamic scene change according to an embodiment of the present invention is stored and installed may be mounted on the user equipment through an interface.

It should be understood that the present invention may be changed and modified by those skilled in the art without departing from the scope of the present invention. Accordingly, the embodiment described herein are provided not to limit, but to explain the spirit of the present invention and the spirit and the scope of the present invention are not limited by the embodiments. The protective range of the present disclosure should be construed on the basis of claims and all the technical spirits in the equivalent range should be construed as being included in the scope of the right of the present disclosure.

The present invention can more simply provide a commodity purchase procedure to a user in consideration of a screen limit and specialty of a mobile device in a commodity purchase procedure performed in real time on the basis of a mobile technology.

Further, since detailed information about a product image is provide through user equipment, a user can acquire detailed information about a commodity and carefully purchase the commodity, similar to actually purchasing the commodity at an offline store.

Further, it is possible to reduce the rate of returning of commodities for the seller of the commodities by providing information about the commodities.

What is claimed is:

1. A merchandise sales service device based on dynamic scene change, the device comprising:
   a communicator configured to communicate with a user equipment through a communication network;
   a commodity explanation provider configured to provide commodity information and an original commodity image through a first screen of the user equipment when a user selects a commodity on the user equipment;
   a commodity image processor configured to:
      create a post-processed commodity image that is obtained by resizing or masking the original commodity image;
      extract a facial area of the user from an image of the user captured by a camera of the user equipment;
      determine an angle of a head of the user corresponding to a change in an angle of facial characteristics of the user, wherein the facial characteristics of the user comprises at least one of a nose of the user, a mouth of the user, or eyes of the user;
      generate a three-dimensional (3D) commodity image corresponding to the determined angle of the head of the user;
      receive, from the user equipment, a hand movement of the user that is obtained by the user equipment based on positions of finger joints of the user;
      create a virtual hand based on the received hand movement of the user;
      modify a shape of the virtual hand by analyzing characteristics of hands of the user;
      generate the 3D commodity image corresponding to movement of the modified virtual hands;
      receive, from the user equipment, an extent of tilting of the user equipment that is detected by a gyro sensor of the user equipment; and
      generate the 3D commodity image corresponding to the extent of tilting of the user equipment; and
   a commodity option provider configured to provide optional information of the commodity through a second screen image of the user equipment based on the post-processed commodity image when the user selects a purchase button displayed on the first screen of the user equipment, wherein the user equipment is configured to change the first screen of the user equipment to the second screen of the user equipment when the user selects the purchase button.

2. The device of claim 1, wherein the device further comprises:
   a purchase processor configured to provide an image of a commodity placed in a shopping cart through a third screen of the user equipment based on the post-processed commodity image when the user selects a shopping cart button displayed on the first screen of the user equipment, wherein the user equipment is configured to change the first screen of the user equipment to the third screen of the user equipment when the user selects the shopping cart button.

3. The device of claim 2, wherein the post-processed commodity image comprises a size to be resized and an area to be masked, wherein a degree of resize and mask is determined by at least one of the optional information of the commodity or a number of commodities placed in the shopping cart.

4. A method of selling merchandise based on dynamic scene change where the method is performed by a merchandise sales service device having a commodity explanation provider, a commodity image processor and a commodity option provider, the method comprising:
   when a user selects a commodity on a user equipment, providing, with the commodity explanation provider, commodity information and an original commodity image through a first screen of the user equipment;
   creating, with the commodity image processor, a post-processed commodity image that is obtained by resizing or masking the original commodity image;
   extracting, with the commodity image processor, a facial area of a user from an image of the user captured by a camera of the user equipment;
   determining, with the commodity image processor, an angle of a head of the user corresponding to a change in an angle of facial characteristics of the user, wherein the facial characteristics of the user comprises at least one of a nose of the user, a mouth of the user, or eyes of the user;
   generating, with the commodity image processor, a three-dimensional (3D) commodity image corresponding to the determined angle of the head of the user;
   receiving, from the user equipment, a hand movement of the user that is obtained by the user equipment based on positions of finger joints of the user;
   creating, with the commodity image processor, a virtual hand based on the received hand movement of the user;
   modifying, with the commodity image processor, a shape of the virtual hand by analyzing characteristics of hands of the user;
   generating, with the commodity image processor, the 3D commodity image corresponding to movement of the modified virtual hand;
   receiving, from the user equipment, an extent of tilting of the user equipment that is detected by a gyro sensor of the user equipment; and
   generating, with the commodity image processor, the 3D commodity image corresponding to the extent of tilting of the user equipment; and
   when the user selects a purchase button displayed on the first screen of the user equipment, providing, with the commodity option provider, optional information of the commodity through a second screen of the user equipment based on the post-processed commodity image, wherein the user equipment is configured to change the first screen of the user equipment to the second screen of the user equipment when the user selects the purchase button.

5. The method of claim 4, wherein, when the user touches the original commodity image for a predetermined amount of time, the method further comprises:
   processing the original commodity image into an image having a predetermined degree of transparency; and
   transmitting the commodity information with the processed original commodity image.

6. A merchandise sales system based on dynamic scene change, the system comprising:
   a merchandise sales service device configured to:
      provide commodity information and an original commodity image through a first screen of a user equipment when a user selects a commodity on the user equipment;

create a post-processed commodity image that is obtained by resizing or masking the original commodity image; and provide optional information of the commodity through a second screen image of the user equipment based on the post-processed commodity image when the user selects a purchase button displayed on the first screen of the user equipment, wherein the user equipment is configured to change the first screen of the user equipment to the second screen of the user equipment when the user selects the purchase button; and a user equipment configured to:

output the commodity information and the original commodity image that are provided by the merchandise sales service device through the first screen of the user equipment;

request the merchandise sales service device to send the optional information of the commodity when the user selects the purchase button; and receive the optional information of the commodity based on the post-processed commodity image; and a commodity image processor configured to:

extract a facial area of the user from an image of the user captured by a camera of the user equipment;

determine an angle of a head of the user corresponding to a change in an angle of facial characteristics of the user, wherein the facial characteristics of the user comprises at least one of a nose of the user, a mouth of the user, or eyes of the user;

generate a three-dimensional (3D) commodity image corresponding to the determined angle of the head of the user;

receive, from the user equipment, a hand movement of the user that is obtained by the user equipment based on positions of finger joints of the user;

create a virtual hand based on the received hand movement of the user;

modify a shape of the virtual hand by analyzing characteristics of hands of the user;

generate the 3D commodity image corresponding to movement of the modified virtual hand;

receive, from the user equipment, an extent of tilting of the user equipment that is detected by a gyro sensor of the user equipment; and generate the 3D commodity image corresponding to the extent of tilting of the user equipment.

\* \* \* \* \*